(12) United States Patent
Sarkar et al.

(10) Patent No.: US 8,782,566 B2
(45) Date of Patent: Jul. 15, 2014

(54) USING GESTURES TO SCHEDULE AND MANAGE MEETINGS

(75) Inventors: Shantanu Sarkar, San Jose, CA (US); Laurent Philonenko, San Francisco, CA (US); Cary A. Bran, Seattle, WA (US); Ali Ebrahami, Fairview, TX (US)

(73) Assignee: Cisco Technology, Inc., San Jose, CA (US)

( * ) Notice: Subject to any disclaimer, the term of this patent is extended or adjusted under 35 U.S.C. 154(b) by 645 days.

(21) Appl. No.: 13/031,656

(22) Filed: Feb. 22, 2011

(65) Prior Publication Data

US 2012/0216151 A1 Aug. 23, 2012

(51) Int. Cl.
*G06F 3/033* (2013.01)
*G06F 3/0488* (2013.01)
*G06F 3/0481* (2013.01)
*G06F 1/16* (2006.01)

(52) U.S. Cl.
CPC .......... *G06F 3/04883* (2013.01); *G06F 3/0481* (2013.01); *G06F 1/1616* (2013.01); *G06F 1/1641* (2013.01)
USPC ........................................ 715/863; 715/728

(58) Field of Classification Search
CPC .. G06F 3/04883; G06F 3/0481; G06F 3/0483
USPC ................................................ 715/863, 728
See application file for complete search history.

(56) References Cited

U.S. PATENT DOCUMENTS

| | | | |
|---|---|---|---|
| 5,168,531 A | 12/1992 | Sigel | |
| 5,347,306 A * | 9/1994 | Nitta | 348/14.1 |
| 5,398,310 A | 3/1995 | Tchao et al. | |
| 5,454,043 A * | 9/1995 | Freeman | 382/168 |
| 5,583,946 A | 12/1996 | Gourdol | |
| 5,612,719 A | 3/1997 | Beernink et al. | |
| 5,617,312 A | 4/1997 | Iura et al. | |
| 6,359,612 B1 | 3/2002 | Peter et al. | |
| 7,469,381 B2 | 12/2008 | Ording | |
| 7,479,949 B2 | 1/2009 | Jobs et al. | |
| 7,653,883 B2 | 1/2010 | Hotelling et al. | |
| 7,665,041 B2 | 2/2010 | Wilson et al. | |
| 7,668,340 B2 | 2/2010 | Cohen et al. | |
| 7,705,830 B2 | 4/2010 | Westerman et al. | |
| 2002/0140667 A1 | 10/2002 | Horiki | |
| 2004/0193413 A1* | 9/2004 | Wilson et al. | 704/243 |

(Continued)

FOREIGN PATENT DOCUMENTS

WO 2005091125 A2 9/2005
WO 2010086866 A1 8/2010

OTHER PUBLICATIONS

Sato et al.; Real-Time Input of 3D Pose and Gestures of a User's Hand and Its Applications for HCI; © IEEE; 8 pages.*

(Continued)

*Primary Examiner* — Linh K Pham
(74) *Attorney, Agent, or Firm* — Edell, Shapiro & Finnan, LLC

(57) ABSTRACT

Techniques and configurations for an apparatus are provided for creating and managing meetings using gestures. Movements of a user's hand in a three-dimensional space are detected. The hand movements in the three-dimensional space are interpreted to identify a gesture intended by the user to set up or manage a meeting among a plurality of persons. An electronic command is generated from the detected gesture to set up or manage the meeting.

23 Claims, 12 Drawing Sheets

(56) References Cited

U.S. PATENT DOCUMENTS

| | | |
|---|---|---|
| 2006/0044265 A1* | 3/2006 | Min .............................. 345/156 |
| 2008/0036743 A1 | 2/2008 | Westerman et al. |
| 2008/0059578 A1* | 3/2008 | Albertson et al. ............ 709/204 |
| 2008/0165140 A1 | 7/2008 | Christie et al. |
| 2008/0309632 A1 | 12/2008 | Westerman et al. |
| 2008/0309634 A1 | 12/2008 | Hotelling et al. |
| 2009/0033737 A1* | 2/2009 | Goose et al. ............... 348/14.07 |
| 2009/0274339 A9* | 11/2009 | Cohen et al. .................. 382/103 |
| 2010/0095206 A1* | 4/2010 | Kim .............................. 715/702 |
| 2010/0257526 A1* | 10/2010 | Zimmet et al. ............... 718/100 |
| 2011/0296353 A1* | 12/2011 | Ahmed et al. ................ 715/848 |
| 2012/0056800 A1* | 3/2012 | Williams et al. ............. 345/156 |
| 2012/0092304 A1* | 4/2012 | Katz .............................. 345/179 |
| 2012/0204120 A1* | 8/2012 | Lefar et al. ................... 715/757 |
| 2012/0319945 A1* | 12/2012 | McCarthy et al. ............ 345/156 |
| 2013/0067343 A1* | 3/2013 | Groves et al. ................. 715/739 |
| 2013/0103446 A1* | 4/2013 | Bragdon et al. ............. 705/7.15 |

OTHER PUBLICATIONS

Segen et al.; Shadow Gestures: 3D Hand Pose Estimation using a Single Camera; © 1999; IEEE; 7 pages.*

Oka et al; Real-Time Fingertip Tracking and Gesture Recognition; © 2002; 8 pages.*

Rahmat et al.; Removing Shadow for Hand segmentation based on Background Subtraction; © 2012; 5 pages.*

Mark Spoonauer, Video: PointGrab's Gesture Tech Comes to Fujitsu Laptops, More to Come, http://blog.laptopmag.com/video-pointgrab-brings-gesture-recognition-to-f . . . , Jul. 6, 2010, pp. 1-9.

* cited by examiner

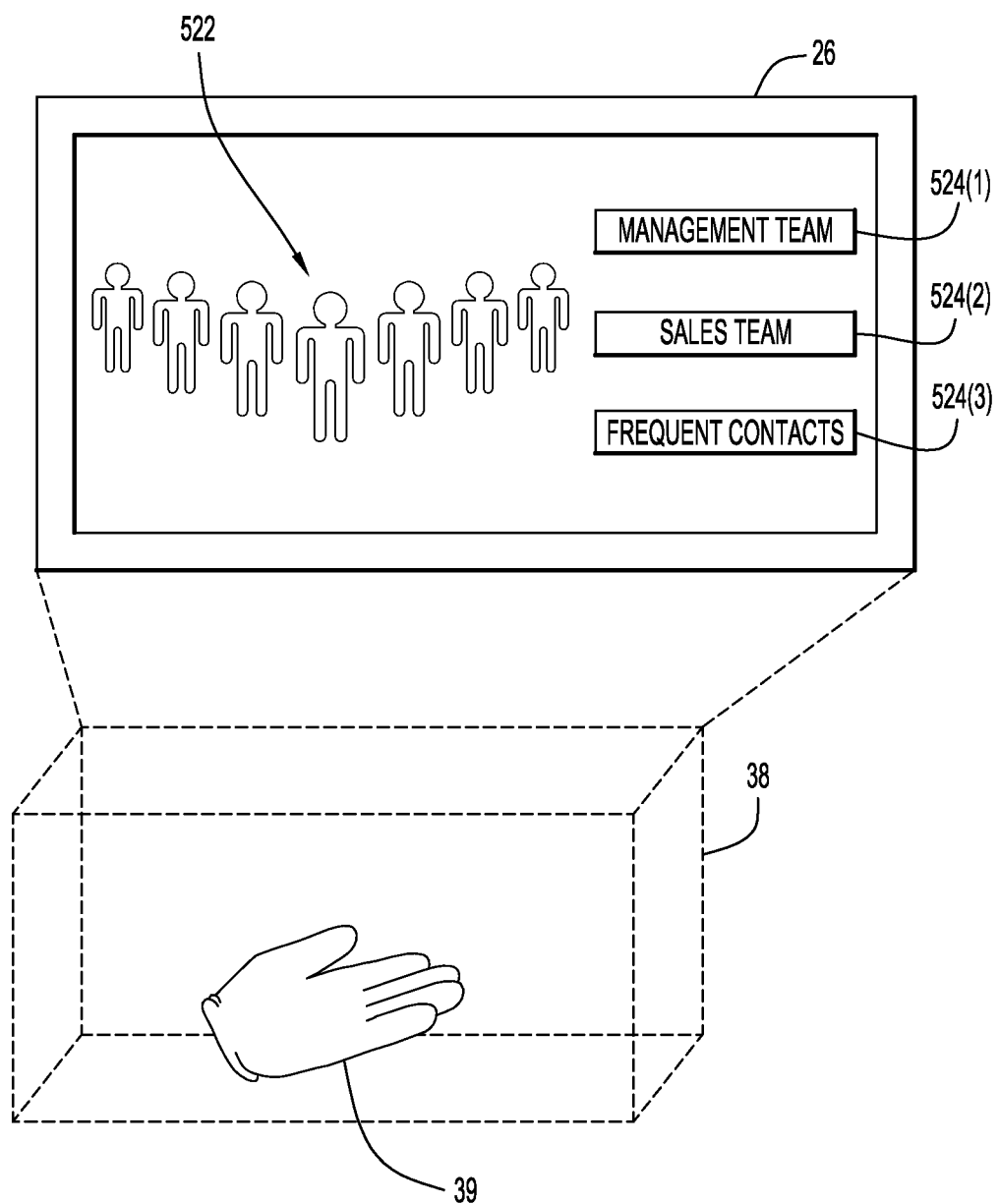

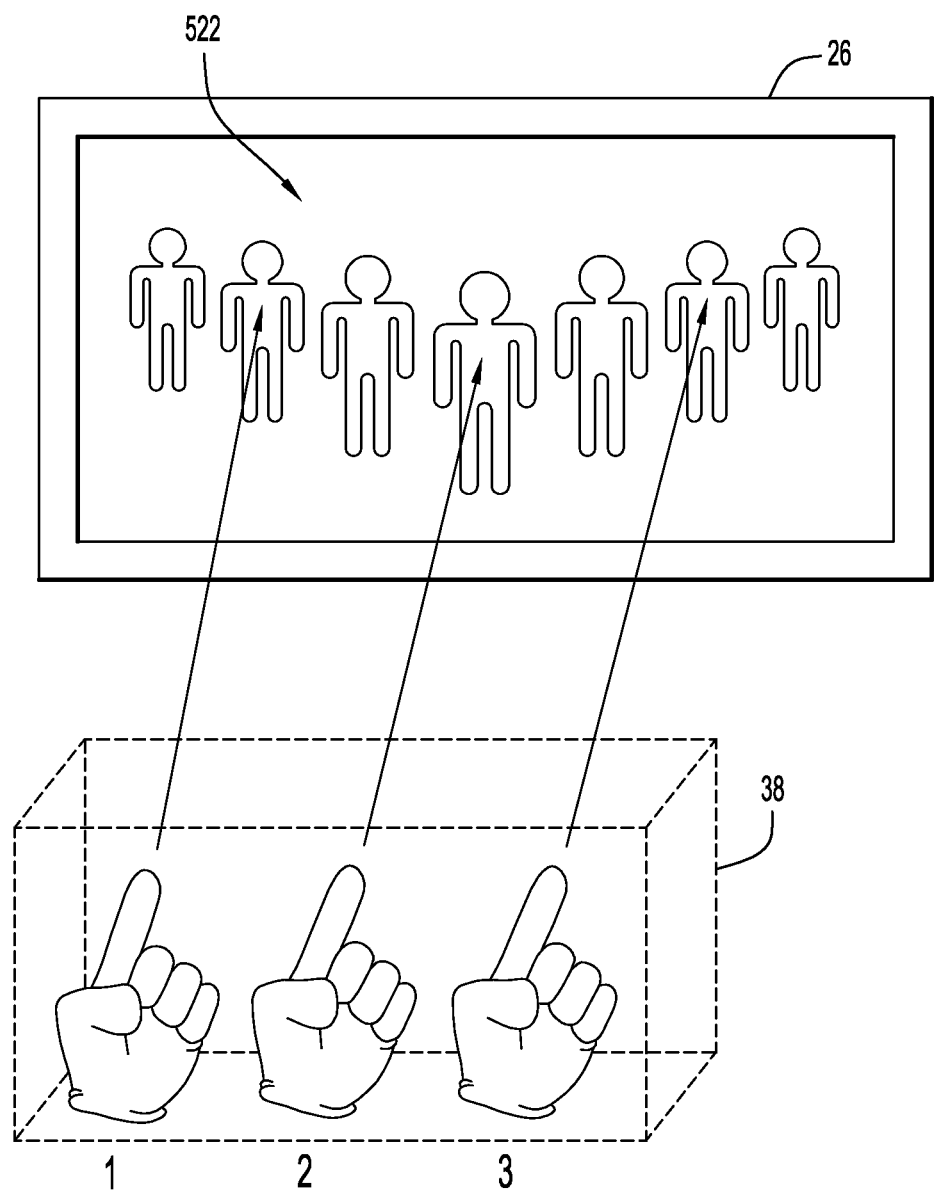

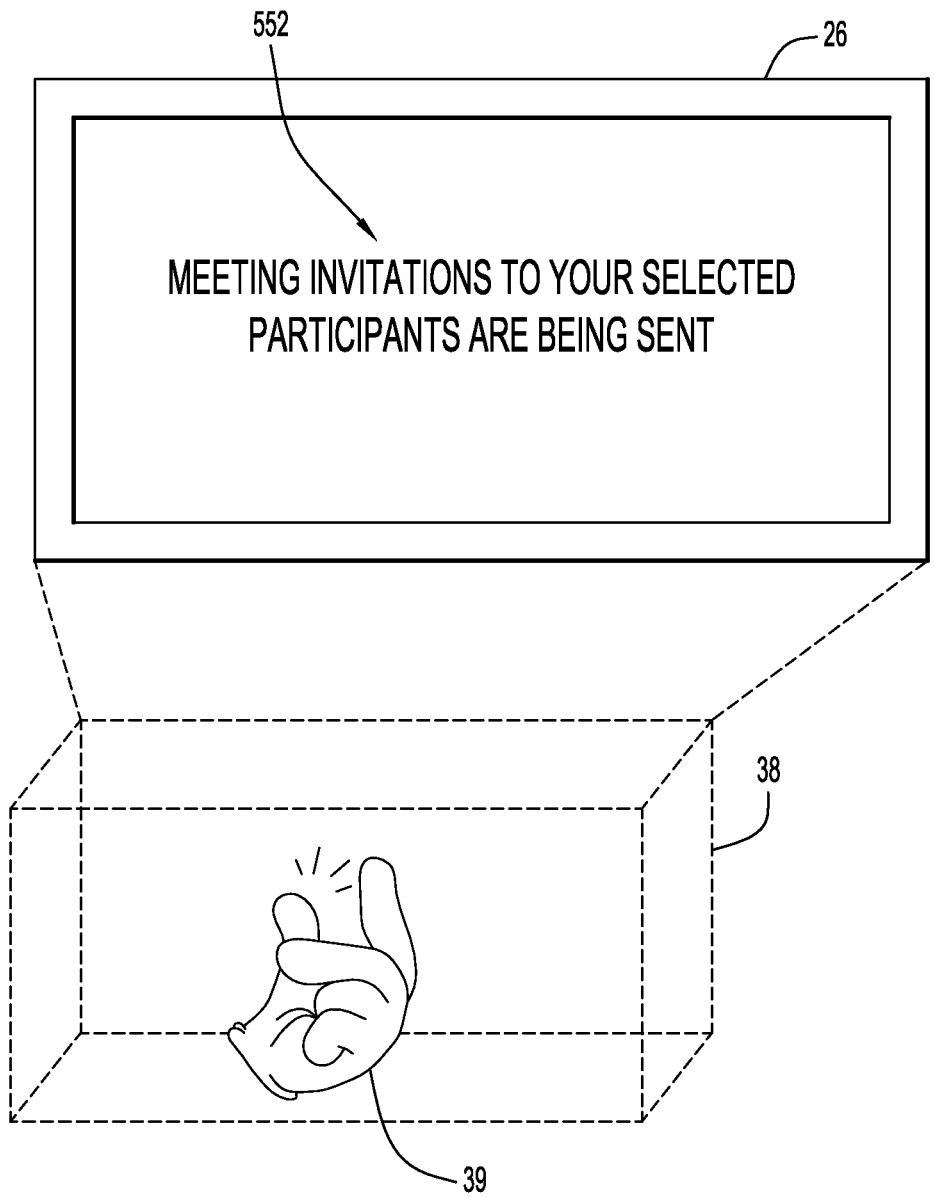

US 8,782,566 B2

USING GESTURES TO SCHEDULE AND MANAGE MEETINGS

TECHNICAL FIELD

The present disclosure relates to scheduling and managing meetings.

BACKGROUND

Inviting participants to a meeting (in person or audio/video conference) can be tedious and not particularly intuitive. For example, a user that schedules a meeting uses a software application or web-based interface in which he/she types the names of the users or email identifiers into fields of a graphical user interface, and selects a day and time for the meeting. Some user interfaces have become so cumbersome that many people avoid using them altogether and delegate the meeting schedule function to another person.

Accordingly, there is a significant opportunity to streamline the meeting scheduling/creation process.

BRIEF DESCRIPTION OF THE DRAWINGS

FIGS. 15A-15C are diagrams illustrating examples of hand gesture interactions with displayed objects as part of the operations in the flow chart of FIG. 14.

DESCRIPTION OF EXAMPLE EMBODIMENTS

Overview

Techniques and configurations for an apparatus are provided for creating (scheduling) and managing meetings using gestures. Movements of a user's hand in a three-dimensional space are detected. The hand movements in the three-dimensional space are interpreted to identify a gesture intended by the user to set up or manage a meeting among a plurality of persons. An electronic command is generated from the detected gesture to set up or manage the meeting.

Example Embodiments

Figure 1:
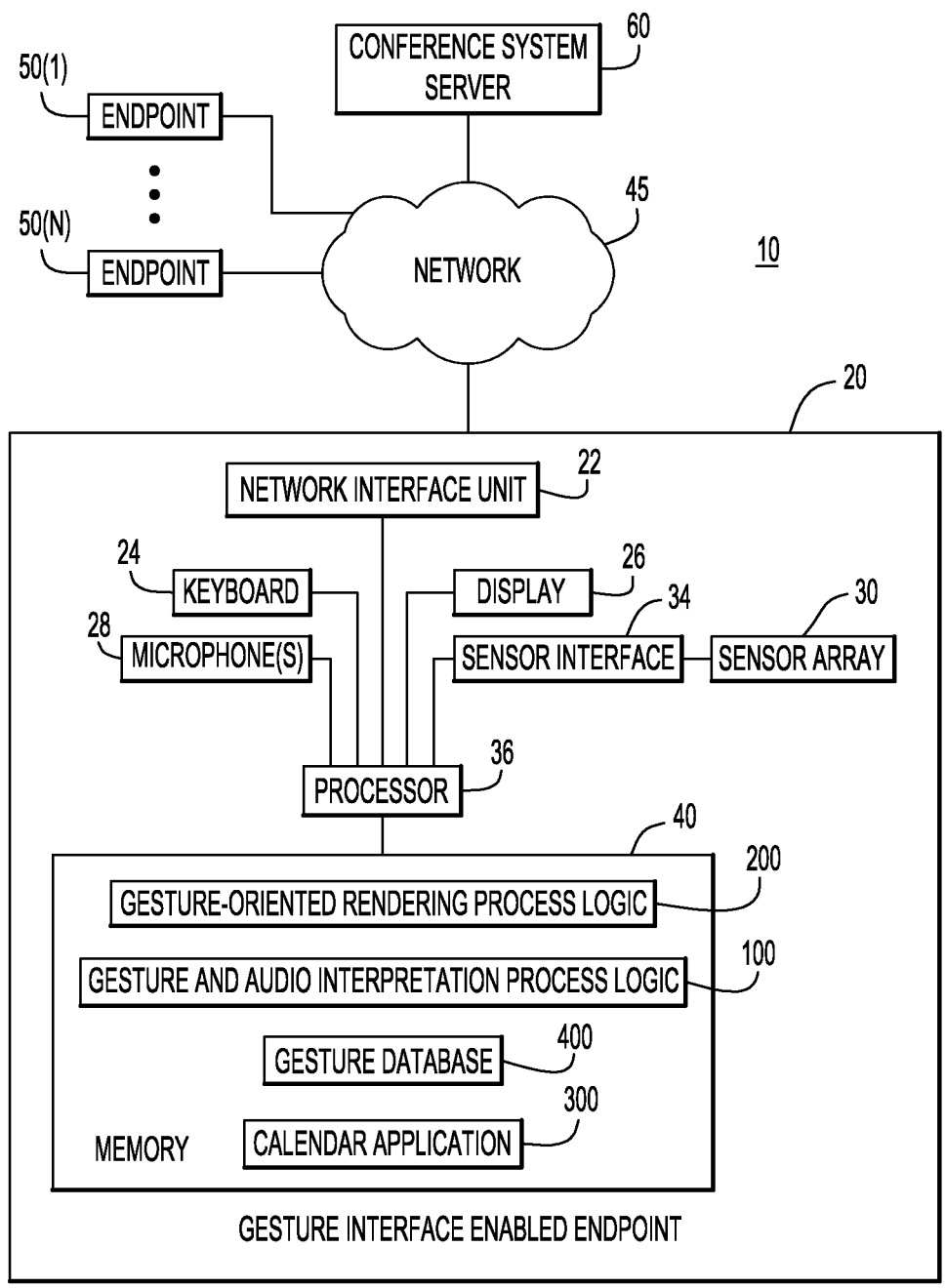
FIG. 1 is a block diagram depicting an example of a system in which an endpoint device is configured to detect gestures to create and manage a meeting among a plurality of meeting participants.

Referring first to FIG. 1, a system is shown that is configured to streamline the creation of meeting using gestures. The system, shown generally at reference numeral 10, comprises a gesture interface enabled endpoint 20 that is coupled to a network 45 to which a plurality of endpoints 50(1)-50(N) and a conference system server 60 are also coupled. The network 45 may comprise any combination of wired or wireless local area networks (LANs) and wired or wireless wide area networks (WANs).

The gesture interface enabled endpoint 20 is designed to allow a user to create and manage meetings between participants through the use of hand gestures with or without associated audio (e.g., spoken voice or hand-clapping). The meeting that a user sets up may be an in-person meeting or an audio or video conference meeting that is supported by the conference system server 60, for example. The other endpoints 50(1)-50(N) may be any endpoint device capable of allowing a user to participate in an audio and/or video conference meeting. Moreover, one or more of the other endpoints 50(1)-50(N) may also be configured for a gesture interface like endpoint 20.

The conference system server 60 is a computing apparatus and related supported devices and resources capable of scheduling and/or hosting (audio and/or video) conferences for a plurality of participants. Examples of a conference system server 60 include servers associated with the WebEx® meeting service, Microsoft Live® meeting service, GoToMeeting® service and DimDim® meeting service.

The gesture interface enabled endpoint 20 comprises a network interface unit 22, a keyboard, a display 26, a microphone 28, a sensor array 30, a sensor interface 34, a processor 36 and a memory 40. The network interface unit 22 enables communication over network 45 for purposes of sending and receiving controls and data (e.g., email messages) associated with the setup of a meeting, as well as data associated with an audio and/or video conference meeting. For example, the network interface unit 22 is an Ethernet network interface card. The keyboard 24 is a physical keyboard that receives user keystroke input. The display 26 is a display device (e.g., flat panel display) that presents images to a user associated with a graphical user interface for the gesture interface techniques described herein, as well as a graphical user interface for other operations supported by the endpoint 20, including participating in audio and/or video conferences, and other more standard user computing operations.

The microphone 28 is configured to detect audio from a user. The microphone 28 may be incorporated into the keyboard 24 or display 26, or it may be a separate standalone device. More than one microphone 28 may be used in some deployments. For example, multiple microphones may be incorporated into the sensor array 30. The microphone 28 may comprise a high-fidelity microphone. A suitable interface card (not shown) is provided to convert analog audio detected by the microphone 28 into digital audio data that can be interpreted by the processor 36.

The sensor array 30 is an array of sensors configured to detect orientation and movements of a hand of a user for purposes of generating a command associated with the creation of or management of a meeting. The sensor interface 34 is coupled to the sensor array 30 and serves as an interface of the sensor data produced by the sensor array to processor 36. The sensor interface 34 converts the sensor output to appropriate digital data that is interpreted by the processor 34. Examples of the sensor array 30 are described in more detail hereinafter in connection with FIGS. 2-8.

The processor 36 serves as a controller for the endpoint 20. The processor 36 comprises one or more microprocessors or microcontrollers, for example, The processor 36 executes software instructions store in memory 40 to perform various operations associated with the gesture interface enabled endpoint 20 described herein. The processor 26 connects to the various other components in the endpoint 20 via a bus (not shown).

The memory 40 may comprise read only memory (ROM), random access memory (RAM), magnetic disk storage media devices, optical storage media devices, flash memory devices, electrical, optical, or other physical/tangible memory storage devices. The memory 40 stores software instructions for gesture-oriented rendering process logic 100, gesture and audio interpretation process logic 200, and a calendar application 300. In addition, the memory 40 stores data in a gesture database 400. Thus, in general, the memory 40 may comprise one or more computer readable storage media (e.g., a memory device) encoded with software comprising computer executable instructions and when the software is executed (by the processor 36) it is operable to perform the operations described for the gesture and audio interpretation process logic 100 and gesture-oriented rendering process logic 200.

Operations of the gesture and audio interpretation process logic 100 and gesture-oriented rendering process logic 200 are described in detail hereinafter in connection with FIGS. 11-15C. Briefly, the gesture and audio interpretation process logic 100 is responsible for interpreting the audio (e.g., voice or sounds) and hand gestures detected by the sensor array 30 and generating meeting related commands such as meeting scheduling/setup and participant selection. The gesture and audio interpretation process logic 100 refers to data stored the gesture database 400 to identify gestures and supplies the corresponding commands to the gesture-oriented rendering process logic 200. To this end, the gesture and audio interpretation process logic 100 is able to perform analysis of sensor data output by the sensor array 30, such as image analysis of image data output by infrared or video cameras, motion data output by motion detectors, etc. Techniques to analyze data from these types of sensors in order to recognize certain types of objects and movements are known in the art and thus not described in detail herein. In addition, the gesture and audio interpretation process logic 100 is configured to perform speech recognition from audio detected by the microphone 28.

The gesture-oriented rendering process logic 200 receives commands from the gesture and audio interpretation process logic 100 and interacts with the calendar application 300 and the conference system 60 (possibly through the calendar application 300) to schedule and start meetings. The gesture-oriented rendering process logic 200 also renders a "gesture-friendly" graphical user interface on the display 26 to allow a user to select meeting participants, schedule meetings and start meetings. The gesture-oriented rendering process logic 200 presents the user with actions that can be performed by selecting objects presented on the display 26 through various schemes described herein.

The calendar application 300 is a software application, such as Microsoft Outlook®, that is used to schedule meeting, and through suitable plug-in software, can interface with the conference system server 60. Thus, a meeting related command generated by the gesture and audio interpretation process logic 100 is supplied to the calendar application 300, via the gesture-oriented rendering process logic 200. When the meeting is to be hosted by the conference system server 60, then the meeting related command is forward to the conference system server 60, which in turn sends out email invitations to the meeting participants, and at the appropriate time of the meeting, hosts the audio or video conference. When the meeting is an in-person meeting, then the conference system server 60 is not necessarily needed and the email invitations can be sent out to the meeting participants by the calendar application 300.

The gesture database 400 stores data that associates or maps gestures to commands to be supplied by the gesture-oriented rendering system to the conference system server 60 and/or calendar application 300. Examples of data stored in the gesture database 400 are described hereinafter.

In one form, the endpoint 20 may be a computing device (e.g., desktop computer, laptop computer, tablet computer, etc.) that is augmented with the sensor array 30 and supporting hardware and software for the gesture recognition operations described herein. In another form, the endpoint 20 may be a dedicated endpoint used in a high-fidelity video conference system, such as Cisco System, Inc.'s Telepresence video conference system.

Reference is now made to FIGS. 2-5 for a description of one example of a sensor array 30. The sensor array 30 comprises a plurality of sensors that can detect hand movements in a three-dimensional region, space or zone called a "detection zone". In the configuration shown in FIGS. 2-4, the sensor array 30 comprises a plurality of sensors 32 arranged along the periphery of display 26, such as a display associated with a desktop or laptop computer or a tablet computer device. The sensors 32 may comprise motion detectors, infrared cameras and stereoscopic high-resolution video cameras, for example. The sensors 32 are positioned on edges of the display 26 and angled or focused towards the center of the display.

Figure 2:
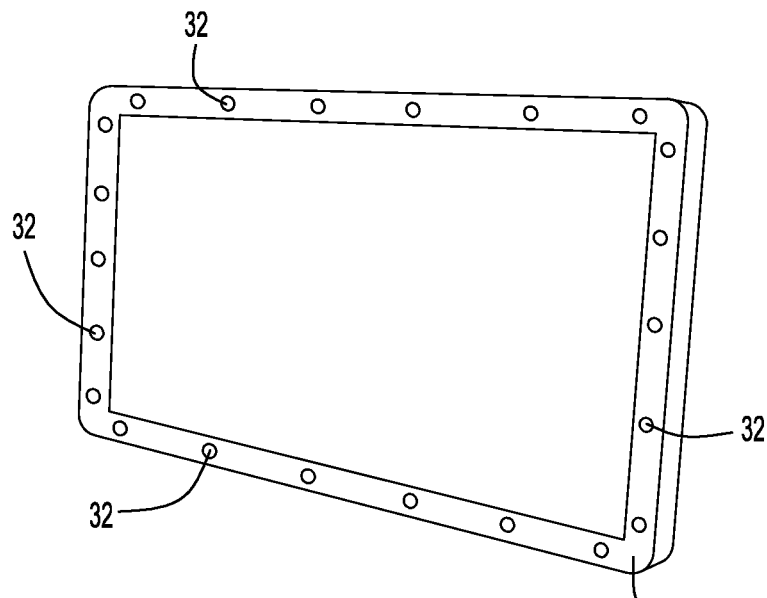
FIG. 2 is a diagram depicting an example of a sensor array mounted to a display device in accordance with one embodiment.
Figure 3:
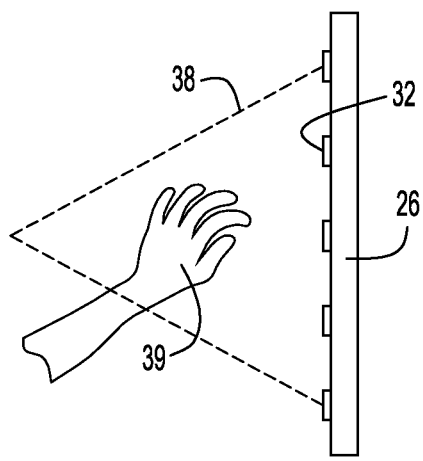
FIG. 3 is a side view of the sensor array shown in FIG. 2 and illustrating a side view of a detection zone in which hand movements of a user are detected.
Figure 4:
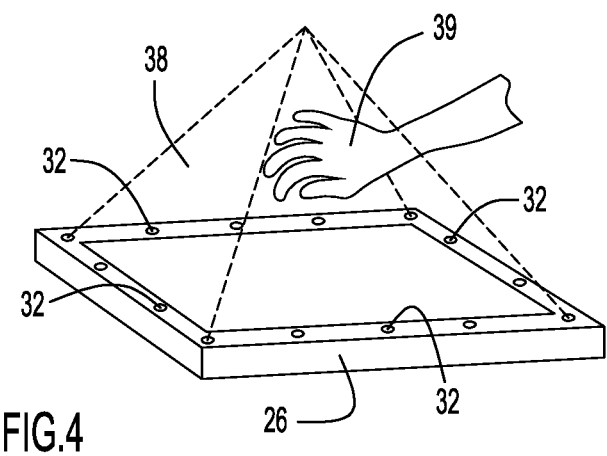
FIG. 4 is a top view of the sensor array of FIG. 2 and illustrating the three-dimensional nature of the detection zone.

As shown in FIGS. 3 and 4, the positioning of the sensors of the sensor array 30 creates a three-dimensional detection zone 38 within which to detect hand movements (gestures) of a user's hand(s) 39 in front of the display 26. The detection zone 38 is invisible and is shown in FIGS. 3 and 4 only for illustration purposes. In one example, the detection zone 38 has a three-dimensional polyhedron shape. Thus, FIGS. 2-4 illustrate one example of a deployment of a sensor array 30 to create a detection zone in front a display. When a user puts his/her hands into the detection zone 38, the gesture-oriented rendering process logic 200 will generate data to display the user's hands on the display 26.

Figure 5:
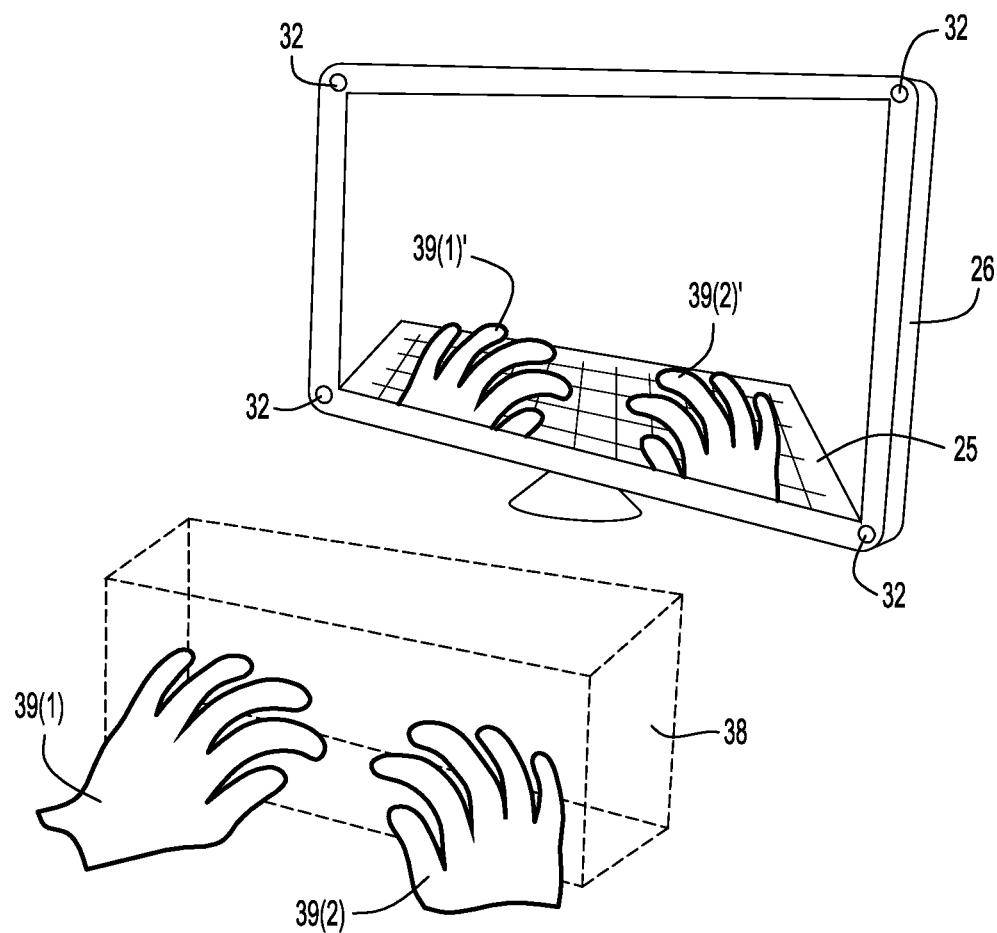
FIG. 5 is a perspective view showing another example of a sensor array mounted to a display device and also illustrating a user's hand interaction in the detection zone to generate a virtual image of the user's hands displayed on the display device.
Figure 6:
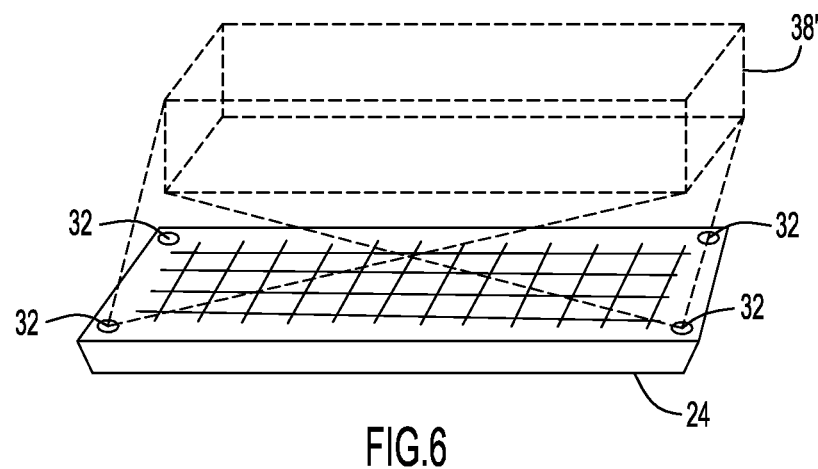
FIG. 6 is a perspective view showing a sensor array mounted to a keyboard to create a detection zone above the keyboard according to another embodiment.

FIG. 5 illustrates another example of a display-mounted sensor array 30 with the sensors 32 placed at four corners of the display 26. FIG. 5 also illustrates that when a user places his/hands 39(1) and 39(2) into the detection zone 38, the gesture-oriented rendering process logic 200 will generate data to display the user's hands 39(1)' and 39(2)' on the display 26 and also display a virtual keyboard 25. Thus, using a sensor array 30 as shown in FIG. 5 removes the need for physical keyboard 24.

Figure 7:
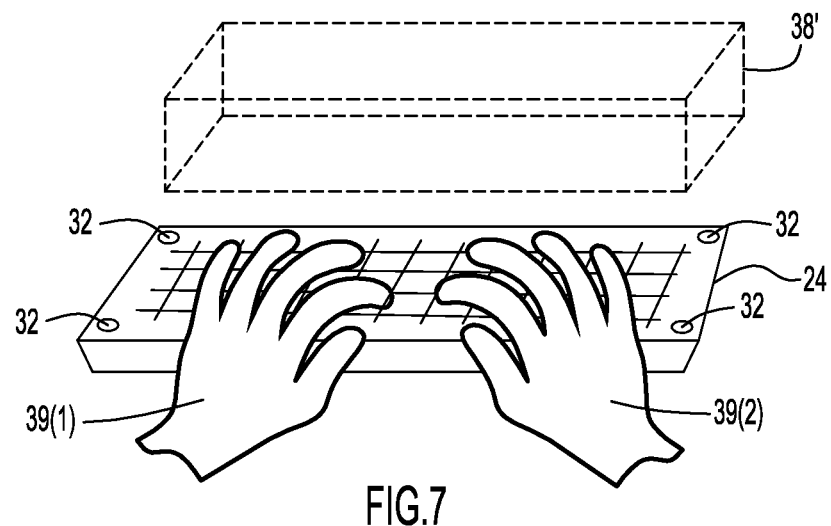
FIG. 7 illustrates a user's interaction with the keyboard without hand movements in the detection zone above the keyboard.
Figure 8:
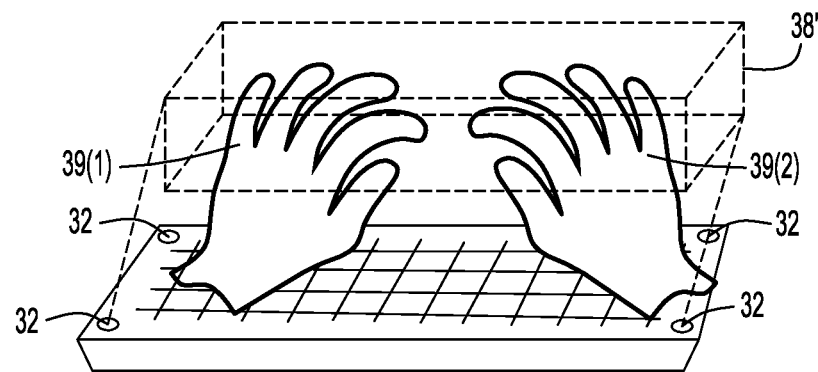
FIG. 8 illustrates a user's hands in the detection zone above the keyboard.

FIGS. 6-10 illustrate another example in which the sensor array 30 is deployed on a keyboard in order to create a detection zone 38' above the keyboard. The detection zone 38' is invisible and shown in FIGS. 6-10 only for illustration purposes. In this example, the sensors are mounted along the edges at four corners of the keyboard 24. As shown in FIG. 7, a user can type on the keyboard 24 normally without putting his/her hands 39(1) and 39(2) in the detection zone 38'. However, when the user wants to make a gesture command, he/she lifts his/her hands up 39(1) and 39(2) into the detection zone 38', as shown in FIG. 8. The processor 24 will detect the output from the sensor array 30 and evaluate the sensor data using the gesture and audio interpretation process logic 100 and the gesture database 400, and in so doing, distinguish interaction with the physical keys of the keyboard 24 versus the detection zone 38'.

Figure 9:
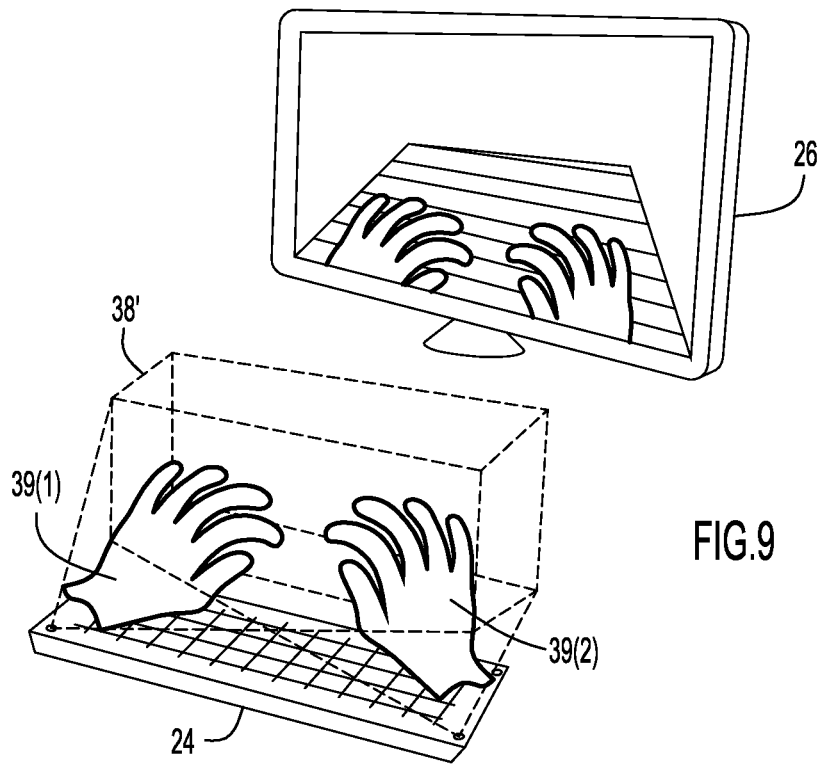
FIG. 9 is a perspective view of a user's hands in the detection zone above the keyboard and a corresponding display of the user's hand on a display device.
Figure 10:
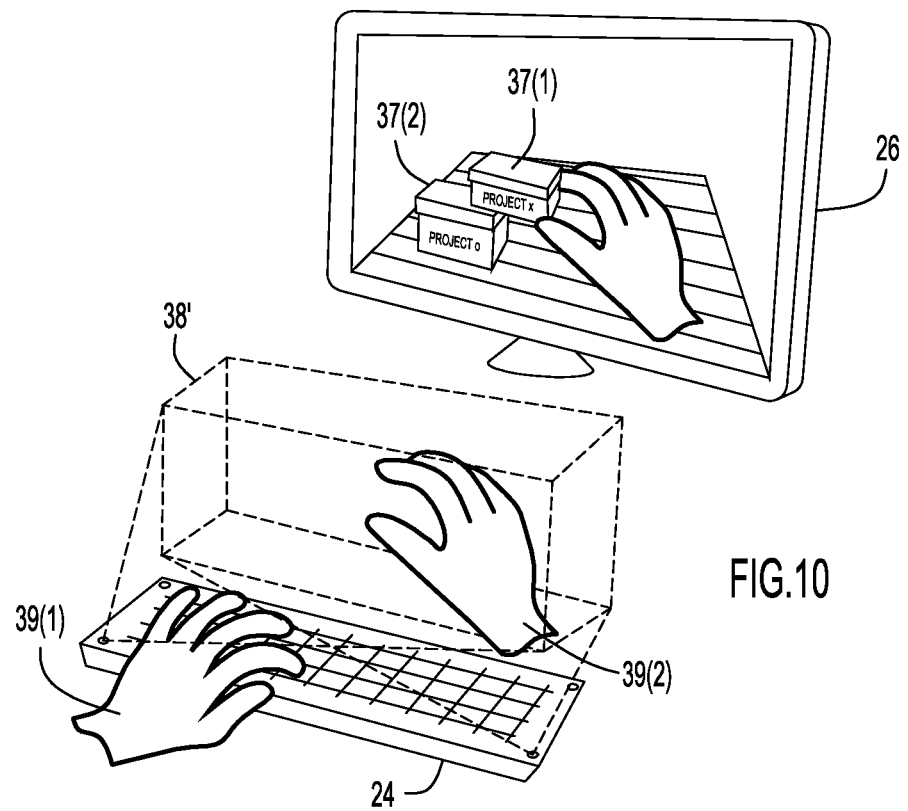
FIG. 10 is a perspective view of a user manipulating virtual objects displayed on the display device by hand movements in the detection zone above the keyboard.

Reference is now made to FIGS. 9 and 10. FIG. 9 shows that as the user's hands move into the detection zone 38', the gesture-oriented rendering process logic 200 will generate data to display the user's hands on the display 26 to visually assist the user to manipulate virtual objects in a virtual three-dimensional space on the display 26. For example, as shown in FIG. 10, the user can use natural gestures to grasp, scroll and turn virtual objects 37(1) and 37(2) displayed on display 26.

The detection zone may take on a variety of shapes. In one example, the sensors in the sensor array 30 are configured and arranged to detect close-range hand movements in a 2 inch deep by 24 inch wide detection zone.

In some implementations, a user may use Quick Response (QR) barcode stickers (or gloves with QR barcodes) on his/her finger tips that are used to facilitate the detection of the location of a user's fingers in the detection zone. To this end, the sensor interface 34 and/or the gesture and audio interpretation process logic 100 are configured to decode the QR barcodes on the user's fingertips. Similarly, the user may wear color-coded stickers (or a glove with different colored finger tips) to facilitate the location detection of a user's fingertips in the detection zone. While the user's hands are in the detection zone, he/she may extend one finger to make gesture commands, such as selecting a meeting participant. The sensor array 30 detects the extended finger and sends coordinates of the finger and the direction that the finger is pointing to the gesture and audio interpretation process logic 100. Finger pointing detection is described in more detail below in connection with FIG. 12.

The gesture database 400 is now described. The table below depicts examples of the data stored in the gesture database 400. Specifically, the gesture database 400 stores data describing each of a plurality of gestures and a corresponding command. The gesture database 400 may also store commands for audio/voice as well. As shown in the table, the hand gesture of an outstretched palm corresponds to a command to initiate a meeting setup sequence, the hand gesture of a finger pointing with a forward motion corresponds to a command to select a displayed object at the location to which the finger points, a hand clap corresponds to a command to immediately start a meeting, and so on. The data stored in the gesture database 400 may be adapted or changed for different users. For example, one user may configure the endpoint 20 to interpret an outstretched palm gesture to correspond to one command and another user may configure the endpoint 20 to interpret that same gesture to correspond to another command.

TABLE 1

Examples of Data Stored in the Gesture Database.

| Gesture | Command |
| --- | --- |
| Outstretched palm | Initiate meeting setup sequence |
| Pointing with forward motion | Select a displayed object at the location pointed to |
| Hand Clap | Start a meeting immediately |
| Finger Snap | Send meeting invitation to selected participants |
| Point and hold for two seconds | Select participant pointed to for invitation to meeting |
| Point and voice "you" | Select participant pointed to for invitation to meeting |
| Point and voice "not you" | Do not select that participant for invitation to meeting |
| Point and voice "Name" | Select participant pointed to with name "Name" |

Figure 11:
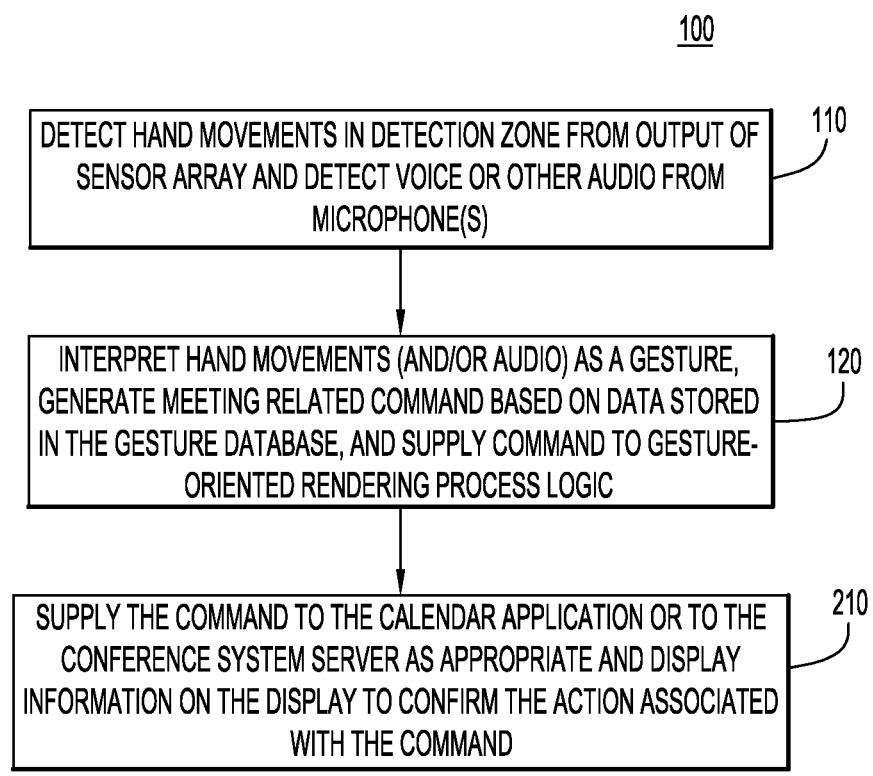
FIG. 11 is a high level flow chart depicting operations performed in a gesture interface enabled endpoint device.
Figure 12:
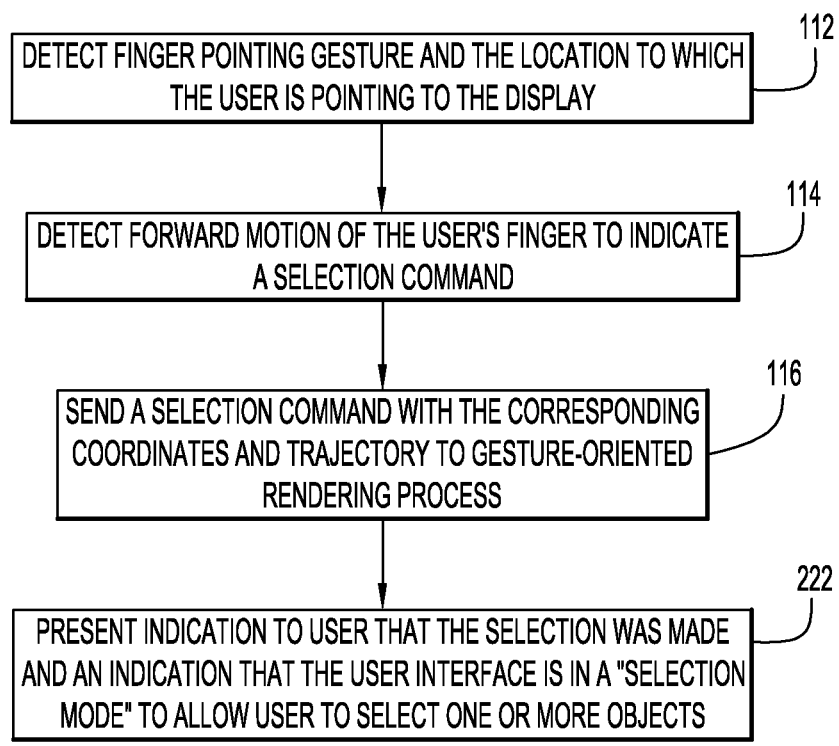
FIG. 12 is a flow chart depicting operations for detecting and responding to a finger pointing selection gesture.

In FIGS. 11 and 12, the operations labeled with reference numerals in the 100's are operations of the gesture and audio interpretation process logic 100 and operations labeled with reference numerals in the 200's are operations of the gesture-oriented rendering process logic 200.

Turning now to FIG. 11, a flow chart is now described that depicts the operations of the gesture and audio interpretation process logic 100 and gesture-oriented rendering process logic 200. At 110, the output of the sensor array is detected for hand movements in the detection zone and the output from the microphone(s) is also detected for voice and/or other audio. At 120, the data obtained at 110 is analyzed to interpret any detected hand movements and identify them as a gesture together with any accompanying audio, and a corresponding meeting related electronic command (a command that is actionable by a computer or electronic device) is generated based on the data stored in the gesture database. Also at 120, the command is supplied to the gesture-oriented rendering process logic 200. At 210, the gesture-oriented rendering process logic 200 supplies the command to the calendar application 300 or to the conference system server 60 as appropriate, and generates information for display to the user on the display to confirm the action associated with the command.

Thus, the operations depicted in FIG. 11 involve detecting with an array of sensors movements of a user's hand in a three-dimensional space; interpreting the hand movements in the three-dimensional space to detect a gesture intended by the user to set up or manage a meeting among a plurality of persons; and generating a command from the detected gesture to set up or manage the meeting. The command is supplied to a calendar application or conference system server to initiate the sending of electronic invitations to one or more persons.

Turning now to FIG. 12, a flow chart is described the depicts operations performed by the gesture and audio interpretation process logic 100 and the gesture-oriented rendering process logic 200 in connection with a detecting a finger pointing gesture to select a displayed object. As explained above in connection with FIGS. 2-10, the sensor array 30 is configured to detect an extended finger of a user and send coordinates of the user's finger and the direction in which the finger is pointing. At 112, the data output by the sensor array 30 is analyzed by the gesture and audio interpretation process logic 100 to detect a finger pointing gesture and determine the location on the display to which the user's finger is pointing. The direction/trajectory that a user's finger is pointing is determined by, for example, computing a Euclidean vector obtained by measuring a distance and angle of the user's finger tip to the user's knuckle's on his/her hand within a two-dimensional plane with respect to top and bottom planes of the detection zone. The coordinates mapped by the sensor array 30 are passed to the gesture-oriented rendering process logic 200 which in turn can present an image of the user's finger and the location to which the user's finger is pointing on the display.

To select a displayed object (for a participant or a meeting related command object), the user needs to continue making the pointing gesture and add to it a forward motion, such that the user's finger tip is moved closer to the display in the detection zone. At 114, the gesture and audio interpretation process logic 100 interprets the output data from the sensor array 30 (which tracks the location and forward motion of the user's fingertip) and detects the forward motion of the user's finger as corresponding to a selection command. At 116, the gesture and audio interpretation process logic 100 sends a selection command message with the calculated coordinates and trajectory vector to the gesture-oriented rendering process logic 200. Another way to generate a finger-based selection command is to monitor a finger retraction and extension motion. At 222, the gesture-oriented rendering process logic 200 presents an indication on the display to the user that the selection has been made, and also an indication that the user interface is in a "selection mode." This allows the user to select more displayed objects.

Figure 13:
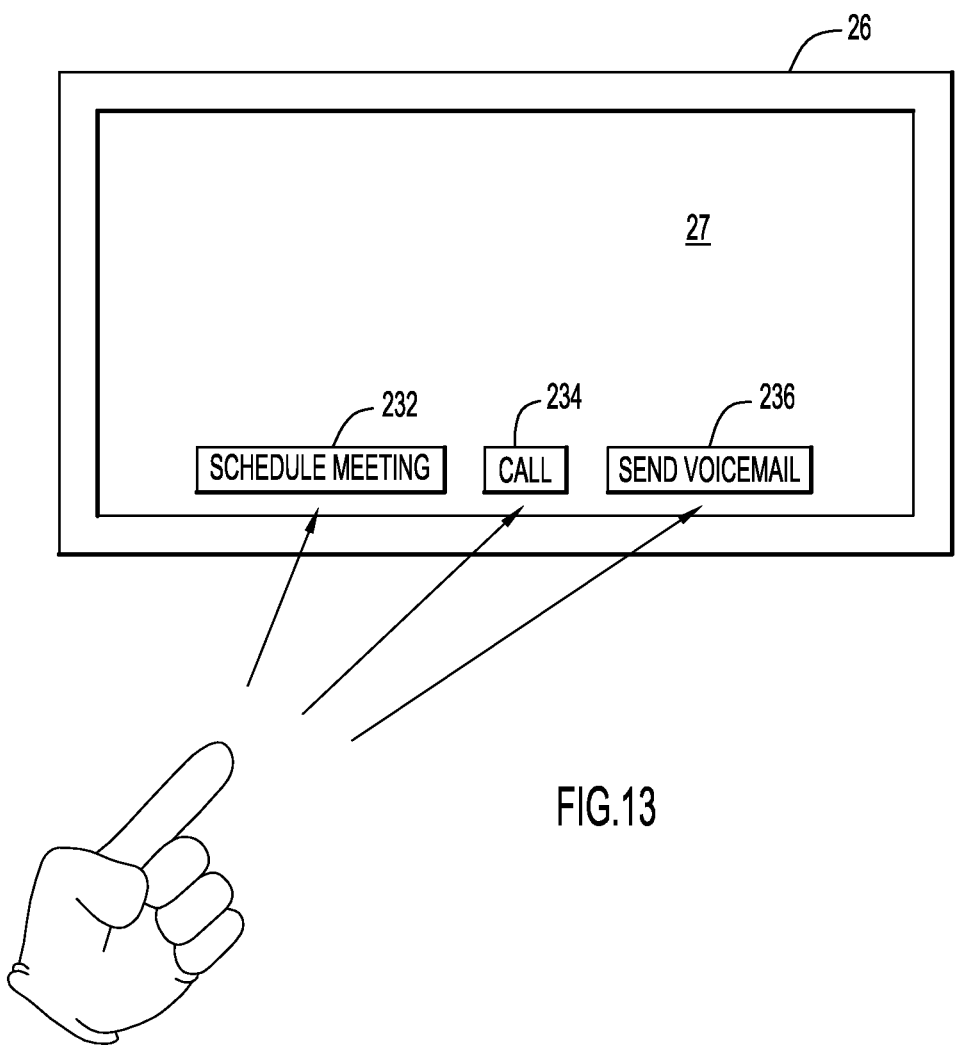
FIG. 13 is a diagram depicting an example of virtual buttons displayed on a display that may be selected by a finger pointing gesture.

Reference is now made to FIG. 13. FIG. 13 shows content displayed by the display 26 on a display screen 27, including "hot" areas that can be selected by pointing gestures of a user's finger. For example, there are "hot" areas or virtual buttons 232, 234 and 236, where button 232 is dedicated to scheduling a meeting, button 234 is dedicated to initiate a voice or video call and button 236 is dedicated to initiate sending a voice mail. These buttons are only examples of the types of buttons that may be displayed in a gesture-oriented user interface.

Another way to perform an action with selected objects is for the user to clap his/her hands together within the detection zone. The microphone 28 will detect the clapping sound and the sensor array 30 will detect the hand movements, and the gesture and audio interpretation process logic 100 determines whether the user has clapped his/her hands together. As explained above, the gesture database is configurable and the clapping gesture may be associated with a command to schedule and start a meeting immediately. Thus, a particular gesture may be assigned to a command to schedule and start a meeting immediately.

Figure 14:
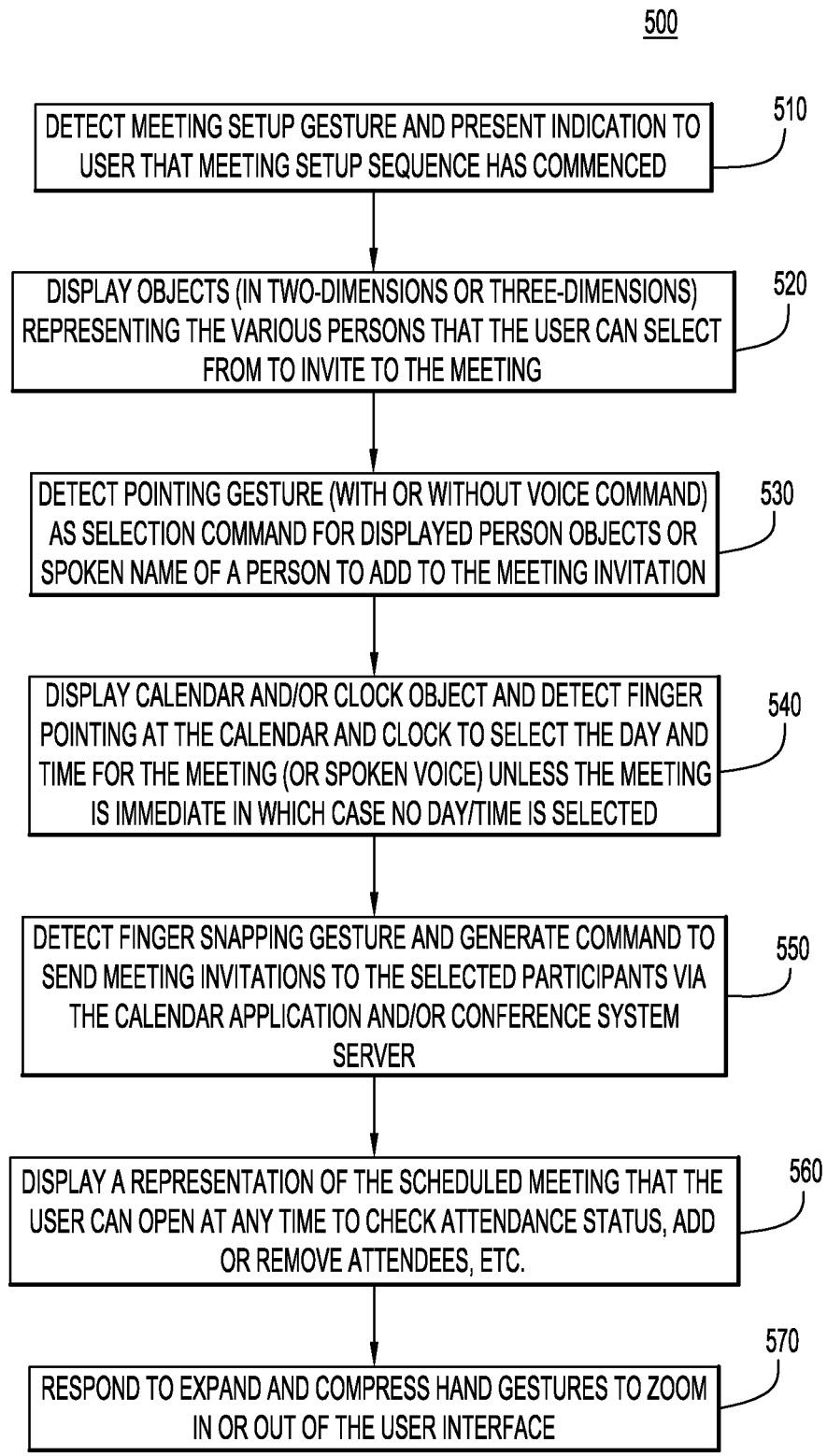
FIG. 14 is a flow chart depicting operations associated with scheduling a meeting in response to hand gestures made by a user.

Reference is now made to FIG. 14 in connection with FIGS. 15A-15C for a description of an overall process 500 to create a meeting based on hand gestures of a user. The operations shown in the flow chart of FIG. 14 are operations performed by the gesture and audio interpretation process logic 100 and gesture-oriented rendering process logic 200 as explained below. At 510, a particular gesture is detected that is associated with initiating a meeting setup or creation sequence. The meeting setup gesture is one that is relatively easy to detect to prevent confusion with any other gesture. FIG. 15A illustrates an example of a hand gesture of an outstretched palm of a user's hand 39 as the meeting setup sequence gesture. When the gesture and audio interpretation process logic 100 detects this particular gesture, the gesture-oriented rendering process logic 200 generates information to indicate to the user that the meeting creation sequence has commenced. To this end, at 520, the gesture-oriented rendering process logic 200 displays objects (in two-dimensions or three-dimensions) each representing a person that the user can select to invite to the meeting. For example, as shown in FIG. 15A, there are a plurality of objects, shown at 522, each object representing a person that the user can invite to a meeting. These objects may be generic "human-like" objects of persons with together with an associated name, or they may be actual photographic images of the face of each person so that each object is uniquely and easily associated by the user with a particular person. The objects shown at 522 are meant to be representative of any suitable photographic or video realistic representation of a user's contacts.

Thus, in one example, the gesture-oriented rendering process logic 200 stores data to visually present a user's "contacts" in a format other than a list or simple icons. Moreover, the objects representing the user's contacts may be grouped by teams or organizational structure, such as a group of objects associated with the user's "management team" and another group of objects associated with the user's "sales team," as well as "frequent contacts," etc. The gesture-oriented rendering process logic 200 retrieves the data for and displays the objects for these groups in response to the user selecting an appropriate one of the buttons 524(1)-524(3). Frequent contacts may be displayed "in front" of less frequent contacts.

At 530, the gesture and audio interpretation process logic 100 interprets hand movements indicating a pointing and selection gesture associated with one of the objects (with or without a voice command) to generate a selection command (supplied to the gesture-oriented rendering process logic 200) of a displayed object for a person, and the gesture-oriented rendering process logic 200 supplies a command (to the calendar application and/or conference system server) to add a person corresponding to the selected object as a participant to be invited to the meeting. As shown in FIG. 15B, the user can use a pointing gesture to point a finger to respective ones of a plurality of objects 522 for the persons he/she wants to invite in the meeting. To increase accuracy or speed of the selection, the pointing gesture can be combined with speech. For example, the user points to the object for a person on the screen while saying "you" or "not you" in order to select or not select a person. In another example, the user may speak the contact's name while pointing at that contact's object. Also, as explained in connection with FIG. 15A, the user may select all of the persons in a particular group by selecting one of the buttons shown at 524. That is, at 530, interpreting may involve interpreting hand movements indicating a point and selection gesture of an object representing a group of persons, and generating a command configured to add each of the persons in the group as a participant to the meeting.

Referring back to FIG. 14, at 540, the gesture-oriented rendering process logic 200 displays a calendar/clock object on the display and a user points a finger at this object and flips through pages for day selection, or swiping up and down for hour selection, order to set the day and time for the meeting. If no scheduling is necessary and the conference is immediate, then this operation is not necessary.

At 550, a particular gesture is detected that is associated with completing the meeting setup sequence. For example, as shown in FIG. 15C, a finger snapping gesture of a user's hand 39 is detected to complete the meeting setup sequence and generate a command to cause electronic invitations (e.g., email invitations) to be sent to persons who have been selected as participants to the meeting by the user at 530. A textual message may be displayed to the user as shown at 552 indicating that the meeting invitations have been sent in response to detecting the meeting setup completion gesture. As another example, a hand clap gesture may be detected to immediately start a meeting for the invitees selected at 530. A meeting that is to be immediately started means that invitations or alerts are sent to the invitees by the calendar application and/or conference system server notifying those persons that a meeting is to begin immediately. The meeting may be an in-person meeting or an audio or voice conference meeting. Also at 550, the gesture-oriented rendering process logic 200 obtains any responses to the meeting invitations (via the calendar application and/or conference system server) indicating that there is a potential conflict for some invitees to the meeting. For example, a visual indication, such as a question mark, may be displayed next to objects for invitees who have a conflict for the meeting. Invitees with no conflict may identified as well, such as by a "check mark".

At 560, the gesture-oriented rendering process logic 200 presents a visual object representation on the display representing the meeting. The user can select this object at any time to check the attendance status, add or remove invitees, change the time or venue of the meeting, etc., using the operations described above.

At 570, the gesture-oriented rendering process logic 200 can present a user interface environment on the display to allow the user to use certain expanding or compressing gestures to zoom in or out of the graphical user interface. An expand gesture may be made by the user moving his two hands apart and the compress gesture by moving their hands together.

The techniques described herein provide an intuitive way to create and manage meetings. A photo or video realistic representation of contacts is presented to a user, and the user makes selections for invitees with pointing or other suitable gestures that are detected an recognized by gesture recognition hardware and software. Meeting participants are selected by a user pointing at them in a three-dimensional space. Gestures are also used to select a time for the meeting, and initiate and complete the meeting creation/scheduling sequence. A visual object representation of the meeting is displayed to the user and the user may access the data associated with the meeting by selecting the object.

The above description is intended by way of example only.

What is claimed is:

1. A method comprising:
   displaying a calendar application;
   detecting movements of a user's hand in a three-dimensional space by an electronic device to select of persons to be invited to a meeting;
   interpreting the hand movements in the three-dimensional space to identify a Euclidean vector corresponding to a pointing direction of the user's finger from fingertip to finger knuckle during a pointing action;
   determining an audio command spoken by the user simultaneously with the pointing action to identify a gesture intended by the user to set up or manage a meeting among a plurality of persons;
   detecting a finger-snapping gesture, based on the interpreting, to generate a command to send meeting invitations to the selected persons to be invited to the meeting; and
   supplying the command to at least one of the calendar application and a conference system server to initiate the sending of electronic invitations to one or more persons.

2. The method of claim 1, and further comprising storing data representing a plurality of gestures and a corresponding command for each gesture.

3. The method of claim 2, wherein interpreting comprises interpreting hand movements of the user to detect a particular gesture associated with initiating a meeting creation sequence.

4. The method of claim 3, and further comprising displaying on a display device a plurality of objects each representing a person, and wherein interpreting comprises interpreting hand movements indicating a pointing and selection gesture associated with one of the objects, and wherein generating comprises generating a command configured to add a person corresponding to the selected object as a participant to be invited to the meeting.

5. The method of claim 3, and further comprising displaying on a display device an object representing a group of persons, and wherein interpreting comprises interpreting hand movements indicating a point and selection gesture of the object representing a group of persons, and wherein generating comprises generating a command configured to add each of the persons in the group as a participant to the meeting.

6. The method of claim 3, wherein interpreting comprises interpreting hand movements for a particular gesture associated with completing the meeting creation sequence, wherein generating comprises generating a command configured to complete the meeting creation sequence and to cause electronic invitations to be sent to the persons who have been selected as participants to the meeting.

7. The method of claim 6, wherein the user is one of a plurality of users each associated with one of a plurality of gesture profiles, and wherein each gesture profile distinctly defines associations between a given gesture and a corresponding electronic command.

8. The method of claim 1, wherein generating comprises generating a command to schedule and start the meeting immediately in response to detecting a particular gesture.

9. The method of claim 3, wherein the pointing action associated with completing the meeting creation sequence is a finger retraction and extension gesture.

10. An apparatus comprising:
    a sensor array configured to detect movements of a user's hand in a three-dimensional space to select of persons to be invited to a meeting; and
    a memory device configured to store data representing a plurality of gestures and a corresponding command for each gesture;
    a processor configured to:
    generate data to display a calendar associated with a calendar application;
    analyze data received from the sensor array to interpret the hand movements in the three-dimensional space and identify a Euclidean vector corresponding to a pointing direction of the user's finger from fingertip to finger knuckle during a pointing action;
    determine an audio command spoken by the user simultaneously with the pointing action to identify a gesture intended by a user to set up or manage a meeting among a plurality of persons;
    detect a finger-snapping gesture in order to generate a command to send meeting invitations to the selected persons to be invited to the meeting; and
    supply the command to at least one of the calendar application and a conference system server to initiate the sending of electronic invitations to one or more persons.

11. The apparatus of claim 10, wherein the sensor array comprises a plurality of sensor devices selected from the group consisting of motion detectors, infrared cameras and video cameras.

12. The apparatus of claim 11, and further comprising a display device coupled to the processor, wherein the plurality of sensors are positioned on a periphery of a display device so as to create the three-dimensional space in front of the display device.

13. The apparatus of claim 11, and further comprising a keyboard device coupled to the processor, and wherein the plurality of sensors are positioned on the keyboard device so as to create the three-dimensional space above the keyboard device.

14. The apparatus of claim 10, and further comprising a network interface unit to enable communications over a network, and wherein the processor is further configured to send the command over the network to a conference system server to initiate the sending of electronic invitations to one or more persons.

15. The apparatus of claim 10, wherein the processor is configured to interpret hand movements of the user to detect a particular gesture for a meeting creation sequence.

16. The apparatus of claim 15, and further comprising a display device, and wherein the processor is configured to generate data for displaying on the display device a plurality of objects each representing a person, and wherein the processor is configured to analyze data from the sensor array to detect hand movements indicating a point and selection gesture associated with one of the objects and to generate a command configured to add a person corresponding to the selected object as a participant to be invited to the meeting.

17. The apparatus of claim 16, wherein the processor is configured to analyze data from the sensor array to detect hand movements for a particular gesture associated with completing the meeting creation sequence, and to generate a command configured to complete the meeting creation sequence and to cause electronic invitations to be sent to the persons who have been selected as participants to the meeting.

18. The apparatus of claim 10, wherein the user is one of a plurality of users each associated with one of a plurality of gesture profiles, and wherein each gesture profile distinctly defines associations between a given gesture and a corresponding electronic command.

19. One or more non-transitory computer readable storage media encoded with software comprising computer executable instructions and when the software is executed operable to:
  generate data to display a calendar associated with a calendar application;
  analyze data from a sensor array that detects movements of a user's hand in a three-dimensional space to detect selection of persons to be invited to a meeting;
  interpret the hand movement in the three-dimensional space to identify a Euclidean vector corresponding to a pointing direction of the user's finger for fingertip to finger knuckle during a pointing action;
  determine an audio command spoken by the user simultaneously with the pointing action to identify a gesture intended by the user to set up or manage a meeting among a plurality of persons;
  detect a finger-snapping gesture in order to generate a command to send meeting invitations to the selected persons to be invited to the meeting; and
  supply the command to at lease one of the calendar application and a conference system server to initiate the sending of electronic invitations to one or more persons.

20. The non-transitory computer readable storage media of claim 19, and further comprising instructions that are operable to store data representing a plurality of gestures and a corresponding command for each gesture.

21. The non-transitory computer readable storage media of claim 20, wherein the instructions that are operable to interpret hand movements comprise instructions that are operable to interpret hand movements to detect a particular gesture associated with initiating a meeting creation sequence.

22. The non-transitory computer readable storage media of claim 21, and further comprising instructions that are operable to display on a display device a plurality of objects each representing a person, and wherein the instructions that are operable to interpret comprise instructions that are operable to interpret hand movements indicating a pointing and selection gesture associated with one of the objects, and wherein the instructions that are operable to generate comprise instructions that are operable to generate a command configured to add a person corresponding to the selected object as a participant to be invited to the meeting.

23. The non-transitory computer readable storage media of claim 22, wherein the user is one of a plurality of users each associated with one of plurality of gesture profiles, and wherein each gesture profile distinctly defines associations between a given gesture and a corresponding electronic command.

* * * * *

UNITED STATES PATENT AND TRADEMARK OFFICE
CERTIFICATE OF CORRECTION

PATENT NO.         : 8,782,566 B2
APPLICATION NO.    : 13/031656
DATED              : July 15, 2014
INVENTOR(S)        : Shantanu Sarkar Page 1 of 1

It is certified that error appears in the above-identified patent and that said Letters Patent is hereby corrected as shown below:

IN THE CLAIMS

Column 12, Line 1, change "movement" to --movements--
Column 12, Line 3, change "for" to --from--
Column 12, Line 12, change "lease" to --least--

Signed and Sealed this
Twentieth Day of October, 2015

Michelle K. Lee
*Director of the United States Patent and Trademark Office*